United States Patent
Nick et al.

(10) Patent No.: US 9,048,015 B2
(45) Date of Patent: Jun. 2, 2015

(54) HIGH-TEMPERATURE SUPERCONDUCTOR (HTS) COIL

(75) Inventors: Wolfgang Nick, Nürnberg (DE); Marijn Pieter Oomen, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 125 days.

(21) Appl. No.: 13/820,822

(22) PCT Filed: May 20, 2011

(86) PCT No.: PCT/EP2011/058233
§ 371 (c)(1),
(2), (4) Date: Mar. 5, 2013

(87) PCT Pub. No.: WO2012/031790
PCT Pub. Date: Mar. 15, 2012

(65) Prior Publication Data
US 2013/0172196 A1  Jul. 4, 2013

(30) Foreign Application Priority Data

Sep. 6, 2010 (DE) .......... 10 2010 040 272

(51) Int. Cl.
| | |
|---|---|
| H01F 6/06 | (2006.01) |
| H01F 41/04 | (2006.01) |
| H02K 55/04 | (2006.01) |
| H02K 3/02 | (2006.01) |

(52) U.S. Cl.
CPC ............... *H01F 6/06* (2013.01); *H01F 41/048* (2013.01); *H02K 55/04* (2013.01); *H02K 3/02* (2013.01); *Y02E 40/625* (2013.01)

(58) Field of Classification Search
CPC .... F16C 32/0438; H02N 15/04; H02K 55/00; H02K 55/04
See application file for complete search history.

(56) References Cited

U.S. PATENT DOCUMENTS

| | | | | |
|---|---|---|---|---|
| 3,416,111 | A | * | 12/1968 | Bogner ........................ 336/60 |
| 4,500,860 | A | | 2/1985 | Vermilyea |
| 4,694,268 | A | * | 9/1987 | Kawamura et al. ........... 335/216 |
| 5,276,281 | A | * | 1/1994 | Sato et al. ..................... 505/230 |
| 5,393,805 | A | * | 2/1995 | Koyama et al. ............... 523/400 |
| 5,683,059 | A | * | 11/1997 | Hara et al. .................. 242/602.3 |
| 6,798,095 | B2 | * | 9/2004 | Steinmeyer ..................... 310/58 |
| 8,260,386 | B2 | * | 9/2012 | Herkert et al. ................ 505/150 |
| 2005/0082935 | A1 | * | 4/2005 | Frank et al. .................... 310/216 |
| 2006/0217269 | A1 | | 9/2006 | Bock |
| 2009/0206968 | A1 | * | 8/2009 | Hussennether et al. ...... 335/216 |
| 2009/0315655 | A1 | | 12/2009 | Damiani |

FOREIGN PATENT DOCUMENTS

| | | |
|---|---|---|
| CN | 101006530 A | 7/2007 |
| DE | 1279182 B * | 10/1968 |

(Continued)

*Primary Examiner* — Colleen Dunn

(57) ABSTRACT

A high-temperature superconductor (HTS) coil includes a coil winding with a superconducting material and a coil former for carrying the coil winding. When the high-temperature supercon-ductor (HTS) coil cools down from a room temperature to an operating temperature, the coil winding or the coil former counteract a thermal shrinkage of the coil winding in order to avoid or reduce a longitudinal compression of the superconducting material of the coil winding.

19 Claims, 2 Drawing Sheets

(56) References Cited

FOREIGN PATENT DOCUMENTS

| | | | |
|---|---|---|---|
| DE | 3888003 T2 | | 6/1994 |
| DE | 10335040 A1 | * | 3/2005 |
| DE | 102006041459 | * | 3/2008 |
| DE | 102006041459 A1 | | 3/2008 |
| DE | 102009018061 A1 | | 10/2010 |
| EP | 0417329 A1 | * | 3/1991 |
| EP | 0451864 A2 | * | 10/1991 |
| EP | 0472197 A1 | * | 2/1992 |
| EP | 0488275 A2 | | 6/1992 |
| JP | 62108507 A | | 5/1987 |
| JP | H03074012 A | | 10/1990 |
| JP | 4032207 A | | 2/1992 |
| JP | H04106906 A | | 4/1992 |
| JP | H06005419 A | | 1/1994 |
| JP | H07142233 A | | 6/1995 |
| JP | H09308222 A | | 11/1997 |
| JP | H10177913 A | | 6/1998 |
| JP | 2000353615 A | | 12/2000 |
| JP | 2008140905 A | | 6/2008 |
| JP | 2009049912 A | | 2/2009 |
| JP | 2009188108 A | | 8/2009 |
| JP | 2010093036 A | | 4/2010 |
| WO | WO 02/31949 A1 | * | 4/2002 |
| WO | WO 0231949 A1 | | 4/2002 |
| WO | WO 2009122126 A1 | | 10/2009 |

* cited by examiner

HIGH-TEMPERATURE SUPERCONDUCTOR (HTS) COIL

CROSS REFERENCE TO RELATED APPLICATIONS

This application is the US National Stage of International Application No. PCT/EP2011/058233 filed May 20, 2011, and claims the benefit thereof. The International Application claims the benefits of German Application No. 10 2010 040 272.9 DE filed Sep. 6, 2010. All of the applications are incorporated by reference herein in their entirety.

FIELD OF INVENTION

The invention relates to a high-temperature superconductor (HTS) coil, in particular for a pole of a rotor of an electrical machine, e.g. of an electrical motor or generator.

BACKGROUND OF INVENTION

High-temperature superconductor (HTS) coils can be used for pole windings of machine rotors, it being possible for them to be cooled from room temperature to operating temperature. The superconducting properties of a superconducting material contained in the coil winding in the HTS conductor develop at operating temperature. The rotor in this case is mounted on a shaft, with the high-temperature superconductor coil being cooled through, for example, a hollow shaft. The rotor of the rotating machine has several poles, the windings of which are cooled via the hollow shaft, with the result that the high-temperature superconductor (HTS) coils are cooled to the appropriate operating temperature.

Traditionally, mostly first-generation (1G HTS) high-temperature superconductors are currently used. Most such strip conductors are a few mm wide and only a fraction of a mm thick. In the case of 1G HTS, they contain filaments of a granular HTS ceramic (e.g. BiSrCaCuO) embedded in a silver matrix, this configuration being created using the so-called silver tube introduction method. With such conductors, no special steps need be taken to avoid compression.

Second generation (2G HTS) strip conductors now exist. These are manufactured in a coating process in keeping with coated conductor architecture. A thin film of the HTS ceramic material, e.g. YBCuO, is applied to a flexible, windable substrate material, for example a strip of an iron alloy (steel, e.g. Hastelloy) that is suitable for use at low temperature and highly flexible, or a nickel-tungsten alloy. In some cases, the production process for the 2G HTS strip also includes one or more intermediate coatings before the application of the superconductor film. Copper can also be applied to one or both sides of the conductor in order to stabilize it against excess currents.

Improvements compared to 1G HTS conductors, in particular higher current density, better mechanical properties and a greater choice of conductor materials and geometry, are expected of 2G HTS conductors.

When used with coils the HTS strip conductor (1G or 2G) is usually enclosed in electrical insulation and, in order to fix it mechanically, the whole is embedded (impregnation) in a resin. As the purpose of the HTS coils is to generate a magnetic field, Lorenz forces are then exerted on the individual HTS strip conductors.

When the high-temperature superconductor (HTS) coil cools down from room temperature to the operating temperature of the high-temperature superconductor (HTS) coil, thermal shrinkage of the coil winding occurs in a radial direction, but also in a circumferential direction. This thermal shrinkage is significantly greater than the free, uncontrolled shrinkage of the HTS conductor, as the impregnating resin (in most cases epoxy resin) used in the manufacture of the coils has a much higher shrinkage value, for example 1.4% of 300K to 30K, than the HTS conductor, which consists of substrate, HTS coating and copper and has a shrinkage value of 0.3% of 300K to 30K. This thermal shrinkage of the coil winding results in compression, in the longitudinal direction (circumferential direction) of the conductor, of the superconducting material contained in the coil winding. When coils made of 2G HTS material are manufactured using traditional methods, irreversible degradation of the superconducting properties of the superconducting material contained in the coil winding occurs as soon as the extent of longitudinal compression exceeds a specific value. The thin ceramic film in 2G HTS conductors is more susceptible to such compression than the filaments in 1G HTS conductors, which consist of many individual granules.

SUMMARY OF INVENTION

An object is to provide a high-temperature superconductor (HTS) coil in which degradation of superconducting properties is avoided to the greatest possible extent as a result of thermal shrinkage.

This object is achieved according to the invention through a high-temperature superconductor (HTS) coil as claimed in the claims.

The invention provides a high-temperature superconductor (HTS) coil with:
at least one coil winding consisting of HTS strip conductors and containing a superconducting material; and with
a coil former for the coil winding;
wherein the coil winding or the coil former or both are designed in such a way that, when the high-temperature superconductor (HTS) coil cools down from room temperature to the operating temperature of the HTS coil they counteract the thermal shrinkage of the coil winding so as to avoid or reduce the longitudinal compression (circumferential direction) of the superconducting material contained in the coil winding.

In a possible embodiment of the high-temperature superconductor (HTS) coil according to the invention the coil former is made of a material of which the thermal shrinkage when the high-temperature superconductor (HTS) coil cools down to its operating temperature is less than the thermal shrinkage of the coil winding without a coil former. Examples are presented below.

In one possible embodiment of the high-temperature superconductor (HTS) coil according to the invention the coil winding is wound at a high winding tension.

In one possible embodiment of the high-temperature superconductor (HTS) coil according to the invention the coil former is made of a material which has an elasticity module (E) of more than $$150.000 M \frac{N}{m^2}$$

or the coil former is constructed in a particularly stable, e.g. solid, form.

In one possible embodiment of the high-temperature superconductor (HTS) coil according to the invention the strip conductor for the coil winding comprises a superconducting HTS ceramic conductor film applied to a substrate material of which the thermal shrinkage when the high-temperature superconductor (HTS) coil cools down to its operating temperature is less than the thermal shrinkage of the HTS ceramic conductor film.

In one possible embodiment of the high-temperature superconductor (HTS) coil according to the invention the strip conductor has an electrically insulating insulation sheath that is embedded in an impregnating material, the thermal shrinkage of the insulating sheath or of the impregnating material being particularly slight when the high-temperature superconductor (HTS) coil cools down to its operating temperature, for example less than the shrinkage of epoxy, which is approximately 1.4%. In another possible embodiment of the high-temperature superconductor (HTS) coil 1 according to the invention the impregnating material also contains metal oxide granules in order to counteract the thermal shrinkage of the coil winding 2. This metal oxide is, for example, an aluminum oxide.

In one possible embodiment of the high-temperature superconductor (HTS) coil the coil former and the coil winding are designed so as to be annular, i.e. to fit a shape of a pole nucleus. This will be described in more detail below.

In a preferred embodiment of the high-temperature superconductor (HTS) coil according to the invention the high-temperature superconductor (HTS) coil is operated at an operating temperature of below 80 Kelvin.

The invention also provides a rotor of an electrical machine with at least one pole, on each of which at least one high-temperature superconductor (HTS) coil is mounted, wherein the high-temperature superconductor (HTS) coil comprises:

at least one coil winding consisting of HTS strip conductors and containing a superconducting material;

a coil former for the coil winding;

wherein the coil winding or the coil former or, advantageously, both, are designed in such a way that, when the high-temperature superconductor (HTS) coil cools down from room temperature to the operating temperature of the (HTS) coil, they counteract the thermal shrinkage of the coil winding so as to avoid or reduce the longitudinal compression (circumferential direction) of the superconducting material contained in the coil winding.

In a possible embodiment of the machine rotor according to the invention each of the pole nuclei counteracts thermal shrinkage of the high-temperature superconductor (HTS) coil on which it is mounted.

BRIEF DESCRIPTION OF THE DRAWINGS

Possible embodiments of the high-temperature superconductor (HTS) coil according to the invention are described below with reference to the attached figures, wherein.

DETAILED DESCRIPTION OF INVENTION

Figure 1:
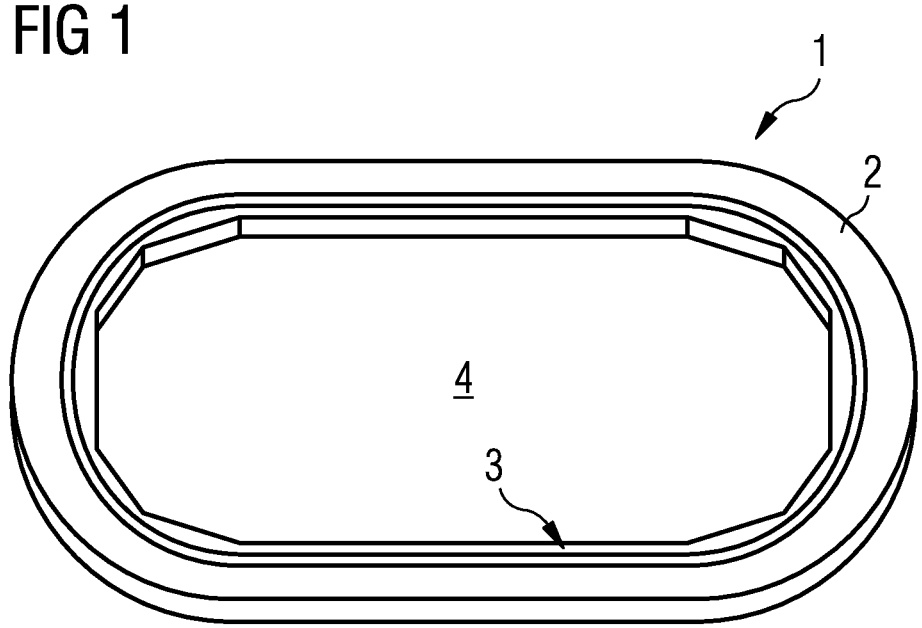
FIG. 1 shows the perspective view representing a possible embodiment of the high-temperature superconductor (HTS) coil according to the invention.

As can be seen from FIG. 1, a high-temperature superconductor (HTS) coil 1 comprises at least one coil winding 2 mounted on a coil former 3. The coil winding 2 contains a superconducting material. In one possible embodiment the coil winding 2 consists of windings of an HTS strip conductor (1G HTS or 2G HTS), which in turn comprises a superconducting HTS ceramic conductor film mounted on a windable substrate material, as well as further coatings and insulation/impregnation around its outside. The superconducting HTS ceramic conductor film can, for example, be a conductor film made of YBaCuO. In order to operate, the high-temperature superconductor (HTS) coil 1 represented in FIG. 1 is cooled down from room temperature to the operating temperature of the high-temperature superconductor (HTS) coil 1.

In one possible embodiment the high-temperature superconductor (HTS) coil 1 is operated at an operating temperature of below 80 Kelvin. When the high-temperature superconductor (HTS) coil 1 cools down from room temperature to operating temperature thermal shrinkage of the coil winding 2 occurs. In the case of the high-temperature superconductor (HTS) coil 1 according to the invention the coil winding 2 or the coil former 3 or both are designed in such a way that, when the high-temperature superconductor (HTS) coil 1 cools down from room temperature to the operating temperature of the HTS coil 1, they counteract the thermal shrinkage of the coil winding 2 so as to avoid or reduce the longitudinal compression (circumferential direction) of the superconducting material contained in the coil winding.

In a possible embodiment both the coil winding 2 and the coil former 3 are designed in such a way that they counteract the mechanical shrinkage of the coil winding 2. In one possible embodiment only the coil former 3 is designed in such a way as to counteract the thermal shrinkage of the coil winding 2. In a further possible embodiment of the high-temperature superconductor (HTS) coil 1 the coil winding 2 is designed so as only to counteract its own thermal shrinkage and/or avoid or reduce the resulting longitudinal contraction (circumferential direction) of the superconducting material.

In one embodiment of the high-temperature superconductor (HTS) coil 1 according to the invention the coil former 3 is made of a material of which the thermal shrinkage when the HTS coil 1 cools down to its operating temperature is less than the thermal shrinkage of the coil winding 2 without a coil former. The coil former 3 is thus preferably made of a material with as low as possible thermal shrinkage. To assure sufficient heat removal from the inner coils, or windings, of the HTS coil 1, the coil former 3 can, in one possible embodiment, be provided with a thermally conductive sheath, for example with a sheath made of copper plating. This sheath is preferably made of a material with high heat conductivity. In addition, the coil former 3 can have a composite or sandwich structure that is enveloped in a sheath made of a material with high heat conductivity.

The coil former 3 can, in one possible embodiment, be made of a plastic material reinforced in a circumferential direction with glass fiber (GFRP). Alternatively, the coil former 3 can be made of steel, in particular steel 4340. When this steel cools down from a room temperature of approximately 300 Kelvin to an operating temperature of as low as 30 Kelvin thermal shrinkage of only 0.21% occurs. In addition, the coil former 3 is preferably made of a material with a low elasticity, in other words of a material which has a high elasticity module E. In one possible embodiment, the coil former 3 consists of a material of which the elasticity module E is greater than $$150.000\text{M }\frac{N}{m^2}.$$

Figure 2:
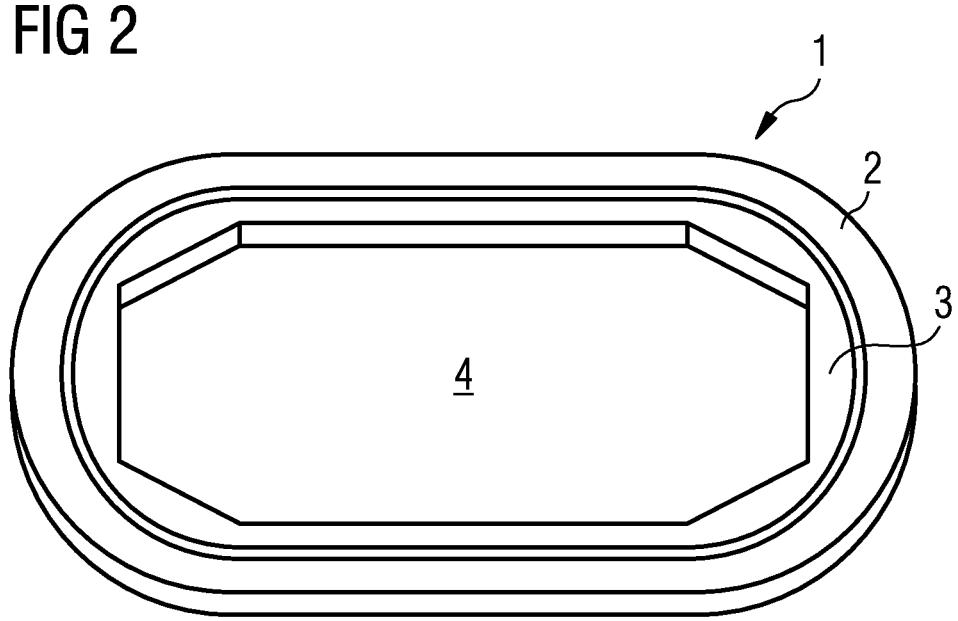
FIG. 2 shows a perspective view representing a further embodiment of the high-temperature superconductor (HTS) coil according to the invention with the cross section of the coil former enlarged.

Also, in one possible embodiment, the coil former 3 has a material cross section that is greater than the minimum material cross section required for the winding process in order that a predefined mechanical stability may be achieved. FIG. 2 shows, for example, an embodiment of the HTS coil 1 according to the invention in which the coil former 3 has an enlarged material cross section compared to that in FIG. 1, is therefore more stable and allows a higher winding tension to be used.

The HTS coil 1 as represented in FIG. 1 or 2 is disposed on, for example, a pole nucleus of a machine rotor. The coil former 3 and the coil winding 2 in this case are designed to fit the shape of the pole nucleus, i.e. they are designed as represented in FIGS. 1 and 2, for example annular like a racetrack. The opening 4 represented in FIGS. 1 and 2 is completely filled by the pole nucleus of the machine rotor. If, when it cools down from room temperature to the operating temperature of the HTS coil 1, the iron in the pole nucleus shrinks less than would an exposed coil winding, then the iron in the pole nucleus determines the thermal shrinkage of the coil winding and thus the longitudinal compression of the HTS ceramic contained therein. In a possible embodiment the high-temperature superconductor (HTS) coil 1 is therefore mounted directly on the iron in the pole nucleus in order that the iron, i.e. steel, of the pole nucleus can counteract the longitudinal compression of the HTS ceramic. In this embodiment the coils are formed on formers that are only just rigid enough for the winding process. The coil winding 2 and the corresponding coil former 3 are then shrunk on a prefabricated pole nucleus of the rotor, i.e. mounted thereon so as to fit exactly. Any mechanical forces that occur when the high-temperature superconductor (HTS) coil 1 is in operation are then retained by the iron in the pole nucleus. The iron in the pole nucleus has lower thermal shrinkage and as a result prevents longitudinal compression (circumferential direction) of the HTS ceramic contained in the coil winding 2. Here, the good connection to a cooling system of both the high-temperature superconductor (HTS) coil 1 and the associated pole nucleus prevents the high-temperature superconductor (HTS) coil 1 from cooling faster than the associated pole nucleus.

In one possible embodiment (not shown), the coil former 3 is a solid coil former which thus has a very large cross section and the high mechanical stability required to absorb winding forces.

In a further possible embodiment of the high-temperature superconductor (HTS) coil 1 according to the invention the coil winding 2 is made of 2G HTS strip conductors with a higher winding tension than is usual for 1G HTS strip conductors due to their (in some cases) lower mechanical strength. As the 2G HTS strip conductors are available in varying widths the winding tension is often given per conductor width. In such cases the total winding tension $F_w$ is calculated using the formula winding tension/width×width of the HTS strip conductor. For example, a 12 mm wide HTS strip conductor is processed at least 25 N/cm winding tension per width, i.e. 30 N of winding tension. As a result, the HTS coil 1 according to the invention has a correspondingly high prestressing force. The prestressing force is calculated from the product of the winding tension, for example 30N per conductor, and the number of windings n of the coil winding. The total prestressing force $F_v$ is thus calculated as follows:

$$F_v = 2 \times n \times F_w,$$

wherein n is the number of windings of the coil winding 2 and $F_w$ is winding tension per conductor.

The high-temperature superconductor (HTS) coil 1 according to the invention preferably comprises a coil winding consisting of 2G HTS strip conductors in which a superconducting HTS ceramic conductor film is applied to a substrate material. Today, such coil windings with 2G HTS ("coated conductors") allow a significantly higher winding tension $F_w$ per conductor width of up to 100 N/cm conductor width. In one possible embodiment of the HTS coil 1 according to the invention, the winding tension $F_w$ per conductor width is more than 50N/cm up to 100 N/cm or more. The coil former 3 designed according to the invention withstands a significantly higher winding tension $F_w$ without inadmissible deformation. In this embodiment, if the coil winding 2 is mechanically prestressed during winding, the thermal shrinkage that occurs when the HTS coil 1 cools down to its operating temperature initially reduces this mechanical prestressing in a circumferential direction. Only when this mechanical prestressing is completely removed is an unacceptable level of longitudinal compression of the superconducting material contained in the coil winding 2 produced. In a preferred embodiment the coil winding 2 is wound at elevated winding tension $F_w$ in such a way that the winding tension of the coil winding is steadily reduced from the interior outwards during the winding of the coil winding.

Figure 3:
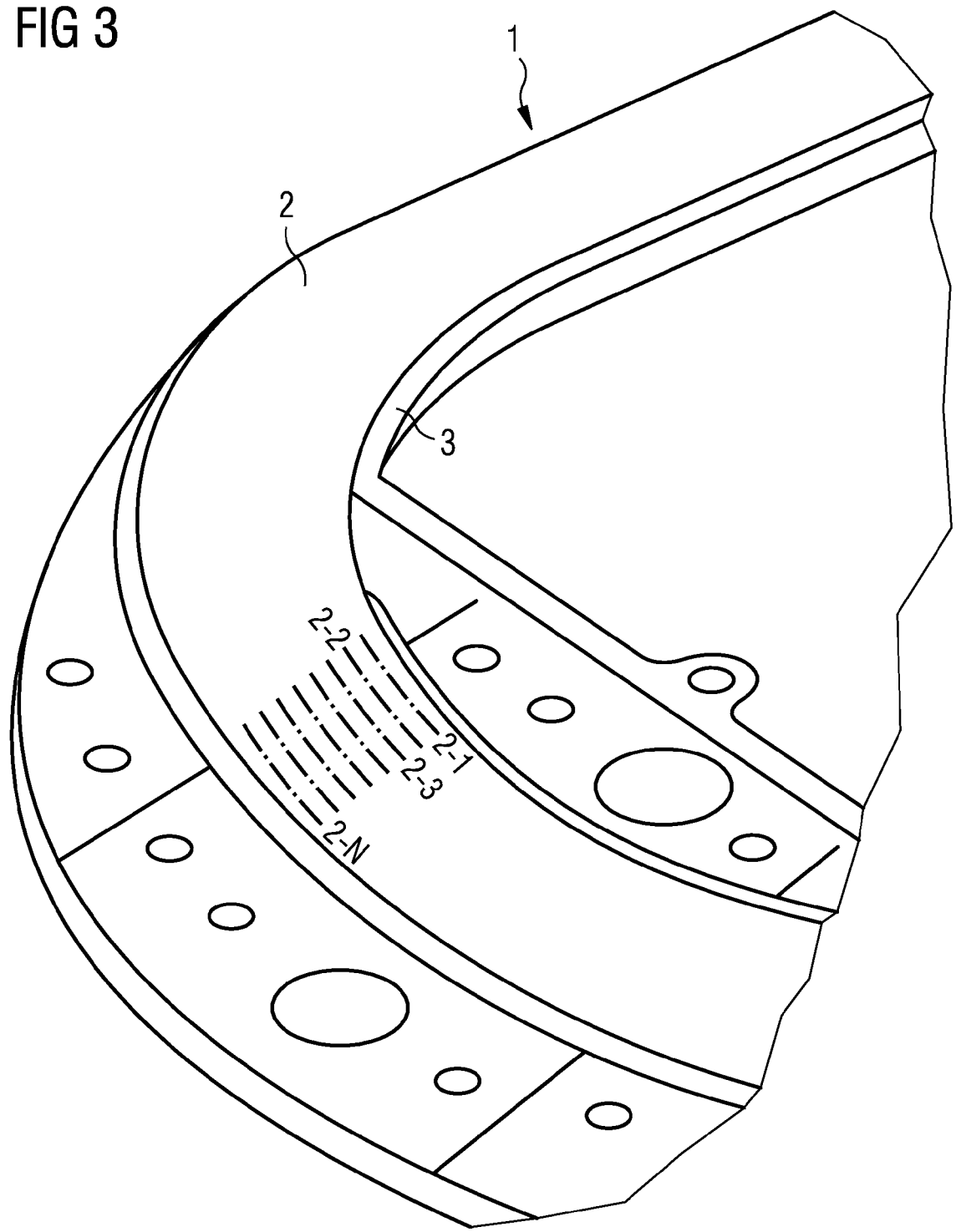
FIG. 3 shows a detailed perspective view of a possible embodiment of the high-temperature superconductor (HTS) coil according to the invention.

FIG. 3 shows a detailed view of a further exemplary embodiment of the high-temperature superconductor (HTS) coil 1 according to the invention. The coil winding 2 comprises a multiplicity of wound coil windings, which are indicated by dashed lines in FIG. 3. The wound coil windings consisting of HTS strip conductors are adapted to an appropriately shaped coil former 3. In this configuration also, it is possible to see the abovementioned advantageous aspects of the HTS coil 1 according to the invention.

The coil former 3 represented in FIG. 3 is preferably made of a material of which the thermal shrinkage during cooling to operating temperature is less than the thermal shrinkage of the material used in the coil winding 2. The coil former 3 is made, for example, of a plastic material reinforced with glass fiber, or of steel, in particular 4340 steel. The coils of the coil winding 2 are preferably wound at a high winding tension $F_w$, with the result that the prestressing force is correspondingly high. In the present embodiment the inner windings of the coil winding 2 are wound at a higher winding tension, which is reduced in the course of the winding process. In such cases, the winding tension per conductor width at the start can be more than 100 N/cm, with the winding tension in the course of the winding process being reduced, for example almost linearly, to a winding tension of more than 25 N/cm. The high-temperature superconductor (HTS) coil 1 represented in FIG. 3 can be a so-called HTS racetrack coil that is mounted on a pole nucleus of a rotor of a rotating machine.

The high-temperature superconductor (HTS) coil 1 according to the invention is preferably designed for a specific operating temperature range, in particular for operation at below 80 K, i.e. at approximately 30 K. The embodiment of the inventive high-temperature super-conductor (HTS) coil 1 is not restricted to the embodiments represented in FIGS. 1-3. For example, in one possible embodiment several high-temperature superconductor (HTS) coils 1 can be provided on one coil former 3. In another possible embodiment the coil winding 2 can be provided between two coil formers 3 in a sandwich structure. This increases the total cross section of the coil formers. It is also possible for several high-temperature superconductor (HTS) coils 1 as represented in FIGS. 1-3 to be mounted on a common pole nucleus of a rotor. Further-more, the inventive high-temperature superconductor (HTS) coil 1 is not restricted to the ring shape represented in FIGS. 1-3 but can instead assume other shapes appropriate to the design of the machine rotor, for example an oval shape or a rectangle with rounded corners. In addition, the high-temperature superconductor (HTS) coil 1 according to the invention as represented in FIGS. 1 and 3 need not be designed so as to be flat but can, for example, be designed so as to fit the surface of a cylinder.

In a further possible embodiment the thermal shrinkage of the coil winding 2 is recorded by a sensor and communicated to a control device. If the thermal shrinkage exceeds, for example, a predetermined threshold value, this can trigger a message communicating the risk of possible compression of the superconducting material contained in the coil winding 2 and the associated degradation of its superconducting properties.

The invention claimed is:

1. A high-temperature superconductor (HTS) coil, comprising:
   at least one coil winding comprising a superconducting material,
   a coil former for carrying the at least one coil winding,
   wherein, when the high-temperature superconductor (HTS) coil cools down from a room temperature to an operating temperature, the coil winding or the coil former counteract a thermal shrinkage of the at least one coil winding in order to avoid or reduce a longitudinal compression of the superconducting material of the at least one coil winding,
   wherein a thermal shrinkage of the insulation sheath is less than a thermal shrinkage of the impregnating material when the (HTS) coil cools down to the operating temperature.

2. The high-temperature superconductor (HTS) coil as claimed in claim 1, wherein the coil former comprises a material having a thermal shrinkage which is less than a thermal shrinkage of the at least one coil winding in circumferential direction without a coil former when the high-temperature superconductor (HTS) coil cools down to the operating temperature.

3. The high-temperature superconductor (HTS) coil as claimed in claim 2, wherein the coil former comprises a plastic material reinforced with glass fiber.

4. The high-temperature superconductor (HTS) coil as claimed in claim 2, wherein the coil former comprises steel.

5. The high-temperature superconductor (HTS) coil as claimed in claim 4, wherein the coil former is made of 4340 steel.

6. The high-temperature superconductor (HTS) coil as claimed in claim 1, wherein the coil former has a casing made of a material with a high heat conductivity.

7. The high-temperature superconductor (HTS) coil as claimed in claim 1, wherein the coil former comprises a material which has an elasticity module of more than 150,000 M N/m².

8. The high-temperature superconductor (HTS) coil as claimed in claim 1, wherein the coil former comprises a material cross section that is greater than a minimum material cross section required for a predefined mechanical stability of a winding process.

9. The high-temperature superconductor (HTS) coil as claimed in claim 1, wherein the coil former is a solid coil former.

10. The high-temperature superconductor (HTS) coil as claimed in claim 1, wherein the at least one coil winding is wound at a winding tension per width of a HTS-strip conductor of more than 25 N/cm and has a corresponding pre-stressing force.

11. The high-temperature superconductor (HTS) coil as claimed in claim 10, wherein the winding tension per width of the HTS-strip conductor is greater than 50 N/cm.

12. The high-temperature superconductor (HTS) coil as claimed in claim 1,
    wherein the at least one coil winding comprises a superconducting HTS ceramic conductor film consisting of HTS-strip conductors,
    wherein the superconducting HTS ceramic conductor film is mounted on a substrate material,
    wherein the substrate material comprises a thermal shrinkage which is less than a thermal shrinkage of the superconducting HTS ceramic conductor film when the (HTS) coil cools down to the operating temperature.

13. The high-temperature superconductor (HTS) coil as claimed in claim 1, wherein the thermal shrinkage of the impregnating material is less than a thermal shrinkage of epoxy resin.

14. The high-temperature superconductor (HTS) coil as claimed in claim 13, wherein the impregnating material comprises metal oxide granules.

15. The high-temperature superconductor (HTS) coil as claimed in claim 1, wherein the coil former and the at least one coil winding have an annular shape according to a shape of a pole nucleus.

16. The high-temperature superconductor (HTS) coil as claimed in claim 1, wherein the operating temperature of the high-temperature superconductor (HTS) coil is below 80 Kelvin.

17. The high-temperature superconductor (HTS) coil as claimed in claim 1, wherein the at least one coil winding is wound such that a winding tension is steadily reduced from an interior outwards during a winding of the at least one coil winding.

18. A rotor of an electrical machine, comprising:
    a plurality of pole nuclei, each pole nucleus comprising at least one high-temperature superconductor (HTS) coil as claimed in claim 1.

19. The rotor as claimed in claim 18, wherein each pole nucleus counteracts a thermal shrinkage of the high-temperature superconductor (HTS) coil mounted onto the pole nucleus.

* * * * *